US012275243B2

(12) United States Patent
Mizuno

(10) Patent No.: US 12,275,243 B2
(45) Date of Patent: Apr. 15, 2025

(54) LIQUID DISCHARGE HEAD

(71) Applicant: BROTHER KOGYO KABUSHIKI KAISHA, Nagoya (JP)

(72) Inventor: Taisuke Mizuno, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 84 days.

(21) Appl. No.: 18/057,331

(22) Filed: Nov. 21, 2022

(65) Prior Publication Data

US 2023/0166505 A1 Jun. 1, 2023

(30) Foreign Application Priority Data

Nov. 26, 2021 (JP) ................................ 2021-191774

(51) Int. Cl.
*B41J 2/14* (2006.01)

(52) U.S. Cl.
CPC ......... *B41J 2/14233* (2013.01); *B41J 2/1433* (2013.01); *B41J 2002/14258* (2013.01); *B41J 2002/14467* (2013.01)

(58) Field of Classification Search
CPC .................. B41J 2/14233; B41J 2/1433; B41J 2002/14258; B41J 2002/14467; B41J 2/04516; B41J 2/04581; B41J 2/04588; B41J 2/04596; B41J 2/04598; B41J 2202/11; B41J 2202/12; B41J 2002/14306; B41J 2002/14459; B41J 2002/14491
USPC ........................................................... 347/20
See application file for complete search history.

(56) References Cited

U.S. PATENT DOCUMENTS

2005/0110834 A1 5/2005 Norkitis et al.
2007/0211090 A1 9/2007 Hibi et al.
2008/0084457 A1 4/2008 Hibi et al.
2008/0180469 A1* 7/2008 Katayama .............. B41J 2/1626 228/175
2010/0001095 A1 1/2010 Matsumoto et al.
(Continued)

FOREIGN PATENT DOCUMENTS

JP 2004082496 A 3/2004
JP 2005153522 A 6/2005
(Continued)

*Primary Examiner* — Jason S Uhlenhake
*Assistant Examiner* — Alexander D Shenderov
(74) *Attorney, Agent, or Firm* — Scully, Scott, Murphy & Presser, PC

(57) ABSTRACT

A liquid discharge head is provided, which includes a nozzle plate which is formed with nozzles, and a channel member which is formed with pressure chambers and connecting channels for connecting the pressure chambers and the nozzles. The connecting channel includes a plurality of portions which have mutually different channel cross-sectional areas. The plurality of portions includes a first portion which is adjacent to the pressure chamber, and a second portion which is adjacent to the first portion, the first portion being interposed between the pressure chamber and the second portion. The first portion has the smallest channel cross-sectional area of those of the plurality of portions. S1≤0.3×S0 and S1≤0.7×S2 are fulfilled (S0: channel cross-sectional are of the pressure chamber, S1: channel cross-sectional area of the first portion, S2: channel cross-sectional area of the second portion).

5 Claims, 7 Drawing Sheets

(56) References Cited

U.S. PATENT DOCUMENTS

| | | | | |
|---|---|---|---|---|
| 2010/0214374 | A1 * | 8/2010 | Stephens | B41J 2/14233 347/74 |
| 2012/0069104 | A1 | 3/2012 | Ikuechi et al. | |
| 2015/0224766 | A1 | 8/2015 | Kawamura et al. | |
| 2017/0008282 | A1 | 1/2017 | Ikeuchi et al. | |

FOREIGN PATENT DOCUMENTS

| | | | |
|---|---|---|---|
| JP | 2007237635 | A | 9/2007 |
| JP | 2007326226 | A | 12/2007 |
| JP | 2008094094 | A | 4/2008 |
| JP | 2015157447 | A | 9/2015 |
| JP | 2016155386 | A | 9/2016 |
| JP | 2016182824 | A | 10/2016 |
| JP | 2016221706 | A | 12/2016 |
| WO | 2007116699 | A1 | 10/2007 |
| WO | 2010137435 | A1 | 12/2010 |
| WO | 2014034892 | A1 | 3/2014 |

* cited by examiner

LIQUID DISCHARGE HEAD

REFERENCE TO RELATED APPLICATIONS

This application claims priority from Japanese Patent Application No. 2021-191774 filed on Nov. 26, 2021. The entire content of the priority application is incorporated herein by reference.

BACKGROUND ART

A liquid droplet generator (liquid discharge head) is known, which is provided with pressure chambers (pressure cells), nozzles, and outflow channels (connecting channels) which are connected to the pressure chambers and which have the nozzles arranged at terminal ends. The outflow channel is composed of a plurality of portions having mutually different channel cross-sectional areas.

DESCRIPTION

When satellites and/or mists are generated from the liquid discharged from the nozzles after passing through the pressure chambers and the connecting channels, the following problems may occur. That is, the satellites and/or mists adhere to the nozzles to cause the discharge failure in some cases. In other cases, the satellites and the mists are landed on the recording medium to deteriorate the image quality.

In order to suppress the foregoing problems, for example, it is conceived that a driving signal, which includes a plurality of pulses in one discharge cycle for forming one dot, is supplied to an actuator for applying the pressure to the liquid contained in the pressure chamber. The plurality of pulses is composed of, for example, a main pulse, a pre-pulse which is applied before the main pulse, and a cancel pulse which is applied after the main pulse. The main pulse is provided in order to discharge liquid droplets having a predetermined size from the nozzle in one discharge cycle. In view of the enhancement of the discharge pressure, it is preferable that the pulse width of the main pulse is in the vicinity of AL (Acoustic Length: one-way transmission time of the pressure wave in the individual channel including the pressure chamber, the connecting channel, and the nozzle). The pre-pulse and the cancel pulse are provided in order to suppress the satellites and the mists. The pulse width of each of the pre-pulse and the cancel pulse is smaller than that of the main pulse.

However, assuming that the pulse width of the main pulse is AL, it is impossible to suppress the satellites and the mists by means of the pre-pulse and the cancel pulse in some cases depending on the configuration of the connecting channel. In such a situation, in order to suppress the satellites and the mists by means of the pre-pulse and the cancel pulse, it is inevitable to increase the pulse width of the main pulse as compared with AL. In such a situation, the entire width of the pulses included in one discharge cycle is increased on account of the increase in the pulse width of the main pulse, and it is impossible to realize the high frequency driving.

An object of the present disclosure is to provide a technique which contributes to the suppression of the satellites and the mists by means of the configuration of the connecting channel and which contributes to the realization of the high frequency driving.

According to an aspect of the present disclosure, there is provided a liquid discharge head including a nozzle plate in which a nozzle is opened, and a channel member. The channel member includes a pressure chamber and a connecting channel connecting the pressure chamber and the nozzle. The connecting channel includes a plurality of portions which have mutually different channel cross-sectional areas. The plurality of portions includes a first portion which is adjacent to the pressure chamber, and a second portion which is adjacent to the first portion, the first portion being interposed between the pressure chamber and the second portion. The first portion has the smallest channel cross-sectional area of those of the plurality of portions. A relational expression of $S1 \leq 0.3 \times S0$ and a relational expression of $S1 \leq 0.7 \times S2$ are fulfilled, assuming that S0 represents channel cross-sectional area of the pressure chamber, S1 represents channel cross-sectional area of the first portion, and S2 represents channel cross-sectional area of the second portion.

The first portion of the connecting channel, which is adjacent to the pressure chamber, is configured to have the smallest channel cross-sectional area of those of the plurality of portions for constructing the connecting channel, and the relationships of the channel cross-sectional areas among the first portion, the second portion, and the pressure chamber are set as described above. Thus, it is possible to contribute to the mitigation of the pressure fluctuation during the discharge. Further, it is possible to contribute to the suppression of the satellites and the mists. It is unnecessary to lengthen the pulse width of the main pulse as compared with AL, and hence it is possible to contribute to the realization of the high frequency driving.

FIRST EMBODIMENT

Figure 1:
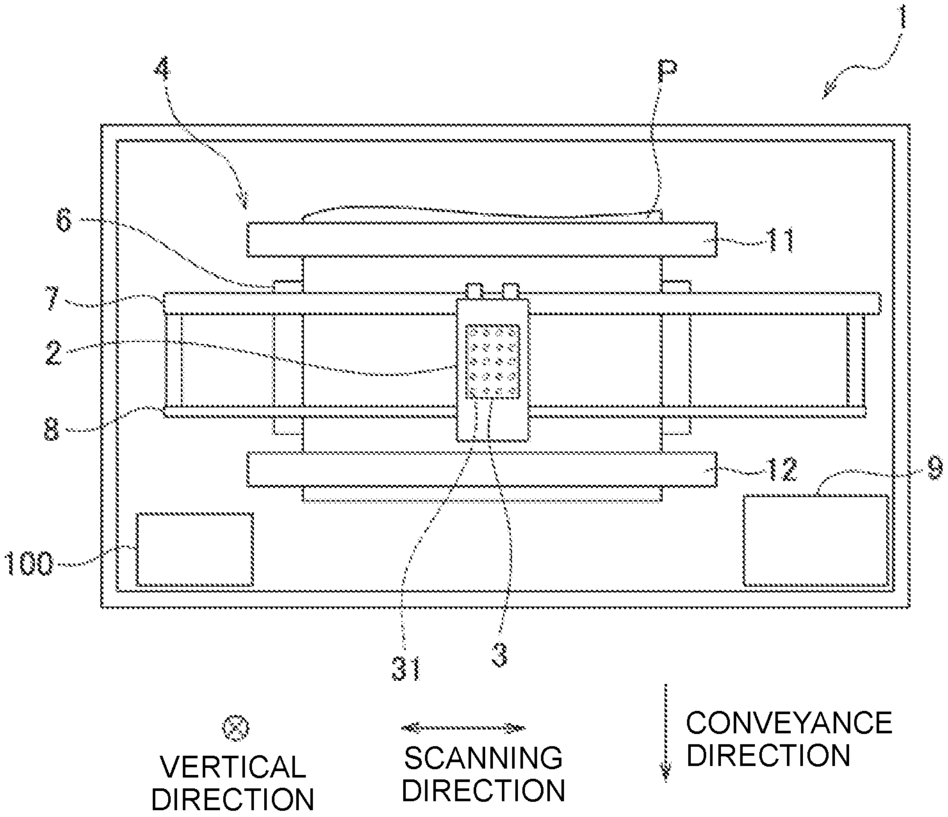
FIG. 1 is a schematic plan view of a printer including a head 3.

As shown in FIG. 1, a head 3 according to a first embodiment is applied to a printer 1. The printer 1 is provided with a carriage 2 which is movable in the scanning direction (direction orthogonal to the vertical direction) while holding the head 3, a platen 6 which supports the recording paper P at a position under or below the head 3 and the carriage 2, a conveyor 4 which conveys the recording paper P in the conveyance direction (direction orthogonal to the scanning direction and the vertical direction), and a controller 100. A plurality of nozzles 31 are formed on the lower surface of the head 3.

The carriage 2 is supported by a pair of guide rails 7, 8 which extend in the scanning direction. The carriage 2 is movable in the scanning direction along the guide rails 7, 8 by driving a carriage motor 2M (see FIG. 4) in accordance with the control of the controller 100.

The conveyor 4 includes two roller pairs 11, 12 which are arranged at positions to interpose the platen 6 and the carriage 2 in the conveyance direction. The roller pairs 11, 12 are rotated in a state in which the recording paper P is interposed, by driving a conveyance motor 4M (see FIG. 4) in accordance with the control of the controller 100. Accordingly, the recording paper P is conveyed in the conveyance direction.

Figure 2:
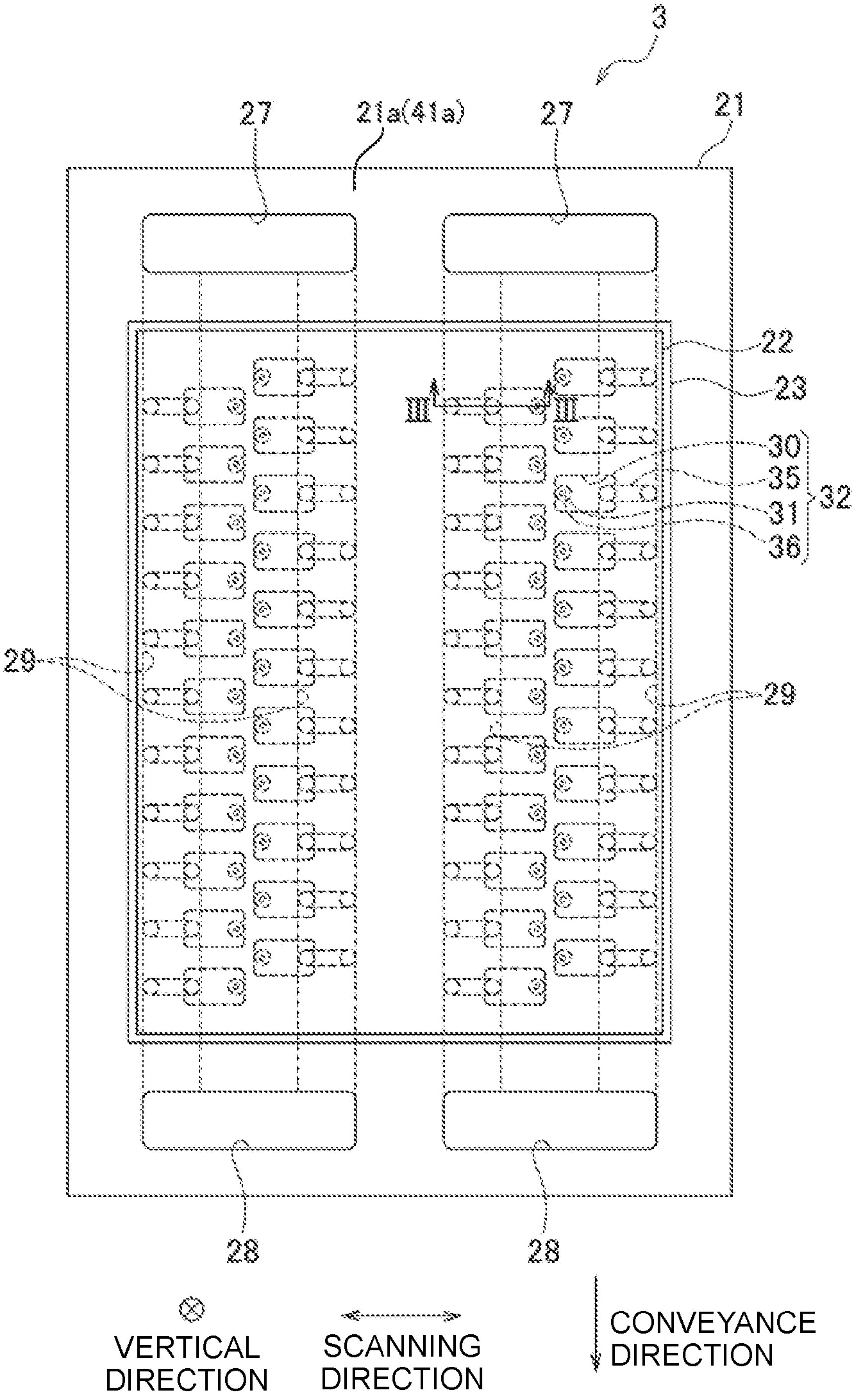
FIG. 2 is a plan view of the head shown in FIG. 1.
Figure 3:
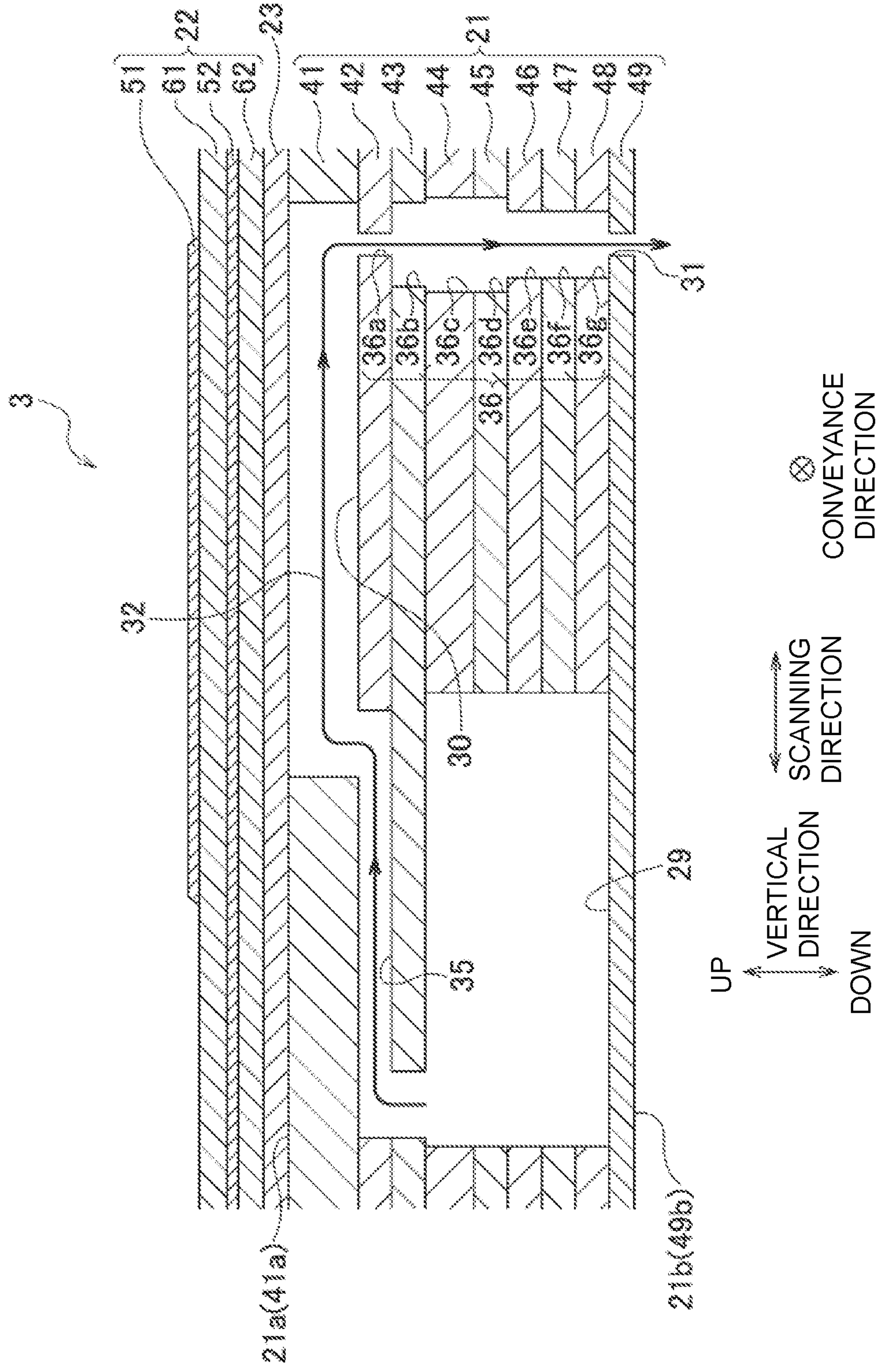
FIG. 3 is a sectional view of the head taken along a line shown in FIG. 2.

As shown in FIGS. 2 and 3, the head 3 includes a channel member 21, an actuator member 22 which is arranged on a surface 21*a* of the channel member 21, and a sealing member 23 which is arranged between the channel member 21 and the actuator member 22.

As shown in FIG. 3, the channel member 21 is composed of nine plates 41 to 49. The plates 41 to 49 are mutually stacked in the vertical direction (thickness direction of each of the plates 41 to 49).

The plate 41 is formed with a plurality of pressure chambers 30. The plate 49 is formed with a plurality of nozzles 31. The surface 41*a* of the plate 41 corresponds to the surface 21*a* of the channel member 21, and the back surface 49*b* of the plate 49 corresponds to the back surface 21*b* of the channel member 21. The plurality of pressure chambers 30 is open on the surface 21*a*, and the plurality of nozzles 31 is open on the back surface 21*b*. The back surface 21*b* is also referred to as "nozzle surface".

The plates 44 to 48 are formed with four common channels 29 (see FIG. 2). The plates 42, 43 are formed with communication channels 35 which are provided for the pressure chambers 30 respectively and which make communication between the pressure chambers 30 and the common channels 29. The plates 42 to 48 are formed with connecting channels 36 which are provided for the pressure chambers 30 respectively and which connect the pressure chambers 30 and the nozzles 31.

As shown in FIG. 3, the connecting channel 36 is composed of seven portions 36*a* to 36*g*.

The seven portions 36*a* to 36*g* are composed of holes which are formed through the plates 42 to 48 respectively. In this embodiment, each of the portions 36*a* to 36*g* is columnar, and the channel cross section of each of the portions 36*a* to 36*g* (cross section taken in the direction orthogonal to the vertical direction in this embodiment) is circular. Each of the portions 36*a* to 36*g* is defined by the side wall which extends in the vertical direction (thickness direction of the plates 41 to 49). In other words, the side wall of each of the portions 36*a* to 36*g* has no step, and each of the portions 36*a* to 36*g* has a certain diameter.

The portion 36*a*, the portion 36*b*, the portions 36*c*, 36*d*, and the portions 36*e*, 36*f*, 36*g*, which are included in the seven portions 36*a* to 36*g*, have mutually different channel cross-sectional areas (cross-sectional areas taken in the direction orthogonal to the vertical direction in this embodiment). The channel cross-sectional areas of the portions 36*c*, 36*d* are identical with each other. The channel cross-sectional areas of the portions 36*e*, 36*f*, 36*g* are identical with each other.

The portion 36*a* (corresponding to the "first portion" of the present disclosure) is adjacent to the pressure chamber 30. The channel cross-sectional area of the portion 36*a* is the smallest of those of the seven portions 36*a* to 36*g*.

The portion 36*b* (corresponding to the "second portion" of the present disclosure) is adjacent to the portion 36*a*, and the portion 36*a* is interposed between the pressure chamber 30 and the portion 36*b*. The channel cross-sectional area of the portion 36*b* is larger than the channel cross-sectional area of the portion 36*a* and smaller than the channel cross-sectional areas of the portions 36*c*, 36*d*.

The portions 36*c*, 36*d* (corresponding to the "third portion" of the present disclosure) are adjacent to the portion 36*b*, and the portion 36*b* is interposed between the portion 36*a* and the portions 36*c*, 36*d*. The channel cross-sectional areas of the portions 36*c*, 36*d* are the largest of those of the seven portions 36*a* to 36*g*.

The portions 36*e*, 36*f*, 36*g* are adjacent to the portions 36*c*, 36*d*, and the portions 36*c*, 36*d* are interposed between the portion 36*b* and the portions 36*e*, 36*f*, 36*g*. The channel cross-sectional areas of the portions 36*e*, 36*f*, 36*g* may be not more than the channel cross-sectional area of the portion 36*b*.

For example, as for the size of the pressure chamber 30, if the depth (length in the vertical direction in this embodiment) is about 80 μm, and the width (length in the conveyance direction in this embodiment) is about 400 μm, then the diameter of the portion 36*a* may be 75 to 110 μm, the diameter of the portion 36*b* may be about 140 μm, and the diameters of the portions 36*c*, 36*d* may be about 175 μm. Further, the thickness of the plate 42 (channel length of the portion 36*a*) may be about 50 μm.

As shown in FIG. 2, the four common channels 29 extend in the conveyance direction respectively, and they are aligned in the scanning direction. The common channel 29 is provided for each of pressure chamber arrays composed of the plurality of pressure chambers 30 arranged in the conveyance direction. The four pressure chamber arrays are aligned in the scanning direction. The ink is supplied from each of the common channels 29 via the communication channels 35 (see FIG. 3) to the plurality of pressure chambers 30 belonging to each of the pressure chamber arrays. Then, each of the actuators of the actuator member 22 is deformed as described later on, and thus the pressure is applied to the ink contained in the pressure chamber 30. The ink passes through the connecting channel 36, and the ink is discharged from the nozzle 31.

As described above, the channel member 21 is formed with the four common channels 29 and the plurality of individual channels 32 (the channel including the nozzle 31 and the pressure chamber 30, and the channel extending from the outlet of the common channel 29 and passing through the communication channel 35, the pressure chamber 30, and the connecting channel 36 to arrive at the nozzle 31) communicated with each of the common channels 29.

As shown in FIG. 2, two supply ports 27 and two return ports 28 are formed on the surface 21*a* of the channel member 21. The two supply ports 27 are arranged on the upstream side in the conveyance direction with respect to the four common channels 29. The two return ports 28 are arranged on the downstream side in the conveyance direction with respect to the four common channels 29. The supply ports 27 and the return ports 28 are communicated with an ink tank 9 (see FIG. 1) via tubes or the like respectively. Each of the supply ports 27 is communicated with the two common channels 29 which are adjacent to one another in the scanning direction, and the ink is supplied from the ink tank 9 to the two common channels 29. Each of the return ports 28 is communicated with the two common channels 29 which are adjacent to one another in the scanning direction, and the ink is returned from the two common channels 29 to the ink tank 9.

The actuator member 22 is arranged at the center of the surface 21*a* of the channel member 21. The actuator member 22 does not cover the supply ports 27 and the return ports 28, and the actuator member 22 covers all of the pressure chambers 30 which are open on the surface 21*a*. As shown in FIG. 3, the actuator member 22 includes two piezoelectric layers 61, 62, a common electrode 52, and a plurality of individual electrodes 51. The piezoelectric layers 61, 62 and the common electrode 52 define the outer shape of the actuator member 22 shown in FIG. 2, and they have rectangular shapes which are one size smaller than that of the channel member 21 as viewed in the vertical direction. On the other hand, the individual electrode 51 is provided for each of the pressure chambers 30, and the individual electrode 51 is overlapped in the vertical direction with each of the pressure chambers 30.

Figure 4:
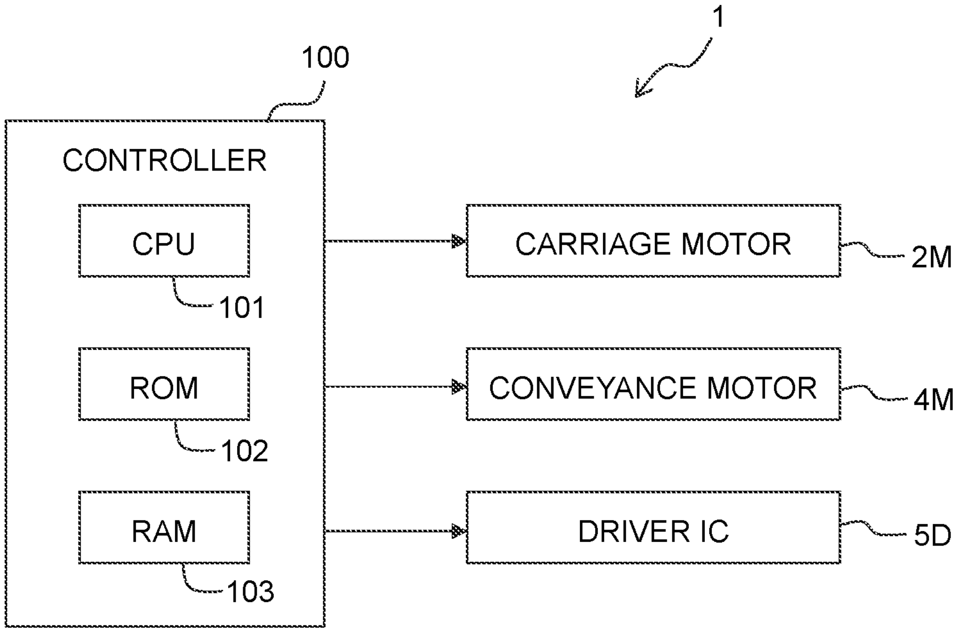
FIG. 4 is a block diagram illustrative of electric configuration of the printer shown in FIG. 1.

The plurality of individual electrodes 51 and the common electrode 52 are electrically connected to driver IC 5D (see FIG. 4). The driver IC 5D maintains the electric potential of the common electrode 52 at the ground electric potential, while the driver IC 5D changes the electric potential of the individual electrode 51 between a predetermined driving electric potential and the ground electric potential. Specifically, the driver IC 5D generates the driving signal on the basis of the control signal supplied from the controller 5. The driving signal is supplied to the individual electrode 51. Accordingly, the electric potential of the individual electrode 51 changes between the predetermined driving electric potential and the ground electric potential. In this situation, the portion (actuator) of the piezoelectric layer 61, which is interposed by the individual electrode 51 and the common electrode 52, is shrunk in the in-plane direction in accordance with the piezoelectric transverse effect. In accordance therewith, the portions of the actuator member 22 and the sealing member 23, which are overlapped in the vertical direction with the pressure chamber 30, are deformed so that the portions protrude toward the pressure chamber 30. Thus, the volume of the pressure chamber 30 is decreased, and the pressure is applied to the ink contained in the pressure chamber 30. The ink passes through the connecting channel 36, and the ink is discharged from the nozzle 31. Simultaneously therewith, the ink contained in the common channel 29 passes through the communication channel 35, and the ink is supplied to the pressure chamber 30. Further, the ink is supplied from the ink tank 9 to the common channel 29.

The plurality of actuators, which is formed in the actuator member 22, functions as unimorph type actuators. The plurality of actuators is independently deformable in accordance with the application of the voltage to each of the individual electrodes 51 by means of the driver IC 5D.

As shown in FIG. 2, the sealing member 23 is arranged at the center of the surface 21*a* of the channel member 21 in the same manner as the actuator member 22. The sealing member 23 does not cover the supply ports 27 and the return ports 28, and the sealing member 23 cover all of the pressure chambers 30 which are open on the surface 21*a*. The sealing member 23 has a rectangular shape which is one size smaller than that of the channel member 21 and one size larger than that of the actuator member 22 as viewed in the vertical direction. The sealing member 23 is adhered to the surface 21*a* by the aid of an adhesive, and the sealing member 23 seals the pressure chambers 30. The sealing member 23 is formed of a material (material such as stainless steel or the like having a low ink permeability) which is different from those of the piezoelectric layers 61, 62, and the sealing member 23 does not have any portion which functions as the actuator.

As shown in FIG. 4, the controller 100 includes CPU (Central Processing Unit) 101, ROM (Read Only Memory) 102, and RAM (Random Access Memory) 103. ROM 102 stores data and programs for allowing CPU 101 to perform various types of control. RAM 103 temporarily stores data to be used when CPU 101 executes programs. CPU 101 executes various types of control in accordance with programs and data stored in ROM 102 and/or RAM 103 on the basis of data inputted from an external apparatus (personal computer or the like) and/or an input unit (switches or buttons provided on an outer surface of a casing of the printer 1).

Figure 5:
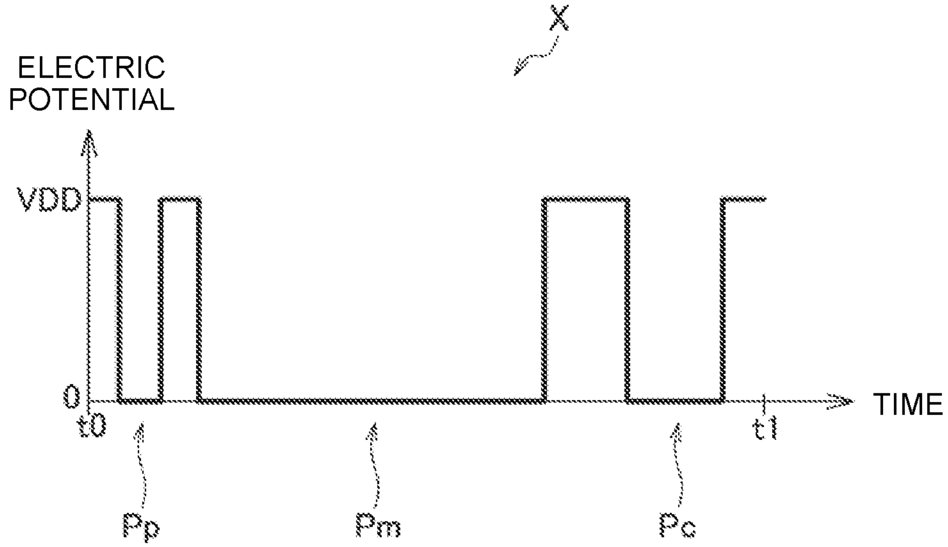
FIG. 5 is a graph illustrative of a driving signal supplied to an actuator by driver IC of the head.

FIG. 5 shows an example of the driving signal supplied to the individual electrode 51 by the driver IC 5D in accordance with the control of the controller 100. The driving signal X shown in FIG. 5 includes three pulses each having a rectangular shape in one discharge cycle (time ranging from the point in time t0 to the point in time t1) to form one dot. The three pulses are composed of a main pulse Pm, a pre-pulse Pp which is applied before the main pulse Pm, and a cancel pulse Pc which is applied after the main pulse Pm. The main pulse Pm is provided in order to discharge the liquid droplets having a predetermined size from the nozzle 31 within one discharge cycle. It is preferable that the pulse width of the main pulse Pm is in the vicinity of AL (Acoustic Length: one-way transmission time of the pressure wave in the individual channel 32) in view of the enhancement of the discharge pressure. The pre-pulse Pp and the cancel pulse Pc are provided in order to suppress the satellites and the mists. The pre-pulse Pp and the cancel pulse Pc have pulse widths smaller than that of the main pulse Pm.

In this embodiment, the predetermined driving electric potential (VDD) is applied to the individual electrode 51 in the initial state (point in time t0). The portion (actuator) of the piezoelectric layer 61, which is interposed by the individual electrode 51 and the common electrode 52, is shrunk in the in-plane direction. The portions of the actuator member 22 and the sealing member 23, which are overlapped in the vertical direction with the pressure chamber 30, are deformed to protrude toward the pressure chamber 30. Then, the shrinkage of the actuator in the in-plane direction is released, and the portions become flat at the timing at which the main pulse Pm rises to allow the individual electrode 51 to have the ground electric potential (0 V). Accordingly, the volume of the pressure chamber 30 is increased as compared with the initial state, and the ink is sucked from the common channel 29 into the individual channel 32. Further, when the main pulse Pm falls thereafter, and the driving electric potential (VDD) is applied to the individual electrode 51, then the actuator is shrunk in the in-plane direction again, and the foregoing portions are deformed to protrude toward the pressure chamber 30. In this situation, the pressure of the ink is raised in accordance with the decrease in the volume of the pressure chamber 30, and the ink is discharged from the nozzle 31.

In other words, in this embodiment, the "pull type jetting system" is adopted as the driving system for the actuator, in which the ink is discharged from the nozzle 31 by increasing the volume of the pressure chamber 30 from the pressure volume and then decreasing the volume of the pressure chamber 30 to not more than the predetermined volume. In the "pull type jetting system" the negative pressure wave is generated in the pressure chamber 30 when the volume of the pressure chamber is increased. After that, the volume of the pressure chamber 30 is decreased at the timing at which the negative pressure wave is inverted and returned as the positive pressure chamber to the pressure chamber 30. Thus, the positive pressure wave is generated in the pressure chamber 30. The pressure waves are superimposed. Owing to the superimposition of the pressure waves as described above, the large pressure is applied to the ink contained in the pressure chamber 30, and it is possible to raise the discharge pressure.

Further, in this embodiment, the driving signal X includes, in one discharge cycle, not only the main pulse Pm but also the pre-pulse Pp and the cancel pulse Pc. Thus, it is possible to suppress the satellites and the mists. However, the satellites and the mists cannot be suppressed by the pre-pulse Pp and the cancel pulse Pc in some cases when the pulse width of the main pulse is AL, depending on the configuration of the connecting channel 36.

The present inventors have found out the following knowledge as a result of diligent investigations. That is, the portion 36*a* of the connecting channel 36 (see FIG. 3), which is adjacent to the pressure chamber 30, is configured to have the smallest channel cross-sectional area of those of the plurality of portions 36*a* to 36*g* for constructing the connecting channel 36. Further, the relationship of the channel cross-sectional area is set as follows in relation to the portion 36*a*, the portion 36*b* of the connecting channel 36 adjacent to the portion 36*a*, and the pressure chamber 30. Thus, the pressure fluctuation is mitigated during the discharge, and it is possible to suppress the satellites and the mists.

$$S1 \leq 0.3 \times S0 \text{ and } S1 \leq 0.7 \times S2$$

(S0: channel cross-sectional are of the pressure chamber 30, S1: channel cross-sectional area of the portion 36*a*, S2: channel cross-sectional area of the portion 36*b*).

Note that the "channel cross-sectional area of the pressure chamber 30" refers to the cross-sectional area taken in the depth direction and the widthwise direction of the pressure chamber 30 (in the vertical direction and the conveyance direction as viewed in FIG. 3). The "channel cross-sectional area of the portion 36*a*" and the "channel cross-sectional area of the portion 36*b*" refer to the cross-sectional areas taken in the radial direction of each of the portions 36*a*, 36*b* (in the scanning direction and the conveyance direction as viewed in FIG. 3).

Further, in view of the suppression of the satellites and the mists, it is preferable that S1 (channel cross-sectional area of the portion 36*a*) is small. However, if S1 is excessively small, then the channel resistance is excessively increased, and any discharge defect may occur. In view of the suppression of the channel resistance, it is preferable that the channel resistance of the portion 36*a* is smaller than the channel resistance of the communication channel 35 (for example, 0.5 to 1.0 Pa·s/mL).

As described above, according to this embodiment, the pressure fluctuation is mitigated during the discharge, and it is possible to suppress the satellites and the mists owing to the configuration of the connecting channel 36 as shown in FIG. 3 (i.e., by providing the configuration such that the portion 36*a* of the connecting channel 36, which is adjacent to the pressure chamber 30, has the smallest channel cross-sectional area of those of the plurality of portions 36*a* to 36*g* for constructing the connecting channel 36, and the relationship of the channel cross-sectional area is set as described above in relation to the portion 36*a*, the portion 36*b*, and the pressure chamber 30. Consequently, it is unnecessary to lengthen the pulse width of the main pulse Pm as compared with AL, and it is possible to realize the high frequency driving.

The portions 36*c*, 36*d*, which are included in the plurality of portions 36*a* to 36*g* for constructing the connecting channel 36, have the channel cross-sectional areas which are larger than the channel cross-sectional area of the portion 36*b* (see FIG. 3). In this case, the sudden shrinkage effect is enhanced for the channel cross-sectional area of the portion 36*a*. Consequently, the pressure fluctuation is mitigated during the discharge, and the effect is enhanced to suppress the satellites and the mists.

The portions 36*a*, 36*d*, which are included in the plurality of portions 36*a* to 36*g* for constructing the connecting channel 36, have the largest channel cross-sectional areas (see FIG. 3). In this case, the pressure fluctuation is more mitigated during the discharge, and the effect is enhanced to suppress the satellites and the mists.

The portion 36*a* is constructed by the hole of one plate 42 (see FIG. 3). If the portion 36*a* is constructed by the holes of the plurality of plates (for example, the plates 42, 43), then the channel length of the portion 36*a* is lengthened by the amount corresponding to the number of plates, and the channel resistance may be excessively increased (consequently, any discharge defect may occur). In relation thereto, in this embodiment, the portion 36*a* is constructed by the hole of one plate 42. Therefore, the channel length of the portion 36*a* can be shortened, and it is possible to suppress the excessive increase in the channel resistance (consequently, it is possible to suppress the occurrence of any discharge defect).

Each of the portions 36*a*, 36*b* is defined by the side wall extending in the vertical direction (in the direction in which the portions 36*a*, 36*b* are adjacent to one another). In other words, each of the portions 36*a*, 36*b* has no step on the side wall, and each of the portions 36*a*, 36*b* has the certain diameter. In this case, any step appears at the boundary between the portion 36*a* and the portion 36*b*, and the portions 36*a*, 36*b* form a stepped shape as viewed in a sectional view. Accordingly, the sudden shrinkage effect is enhanced for the channel cross-sectional area of the portion 36*a*. Consequently, the pressure fluctuation is mitigated during the discharge, and the effect is enhanced to suppress the satellites and the mists.

Second Embodiment

Figure 6:
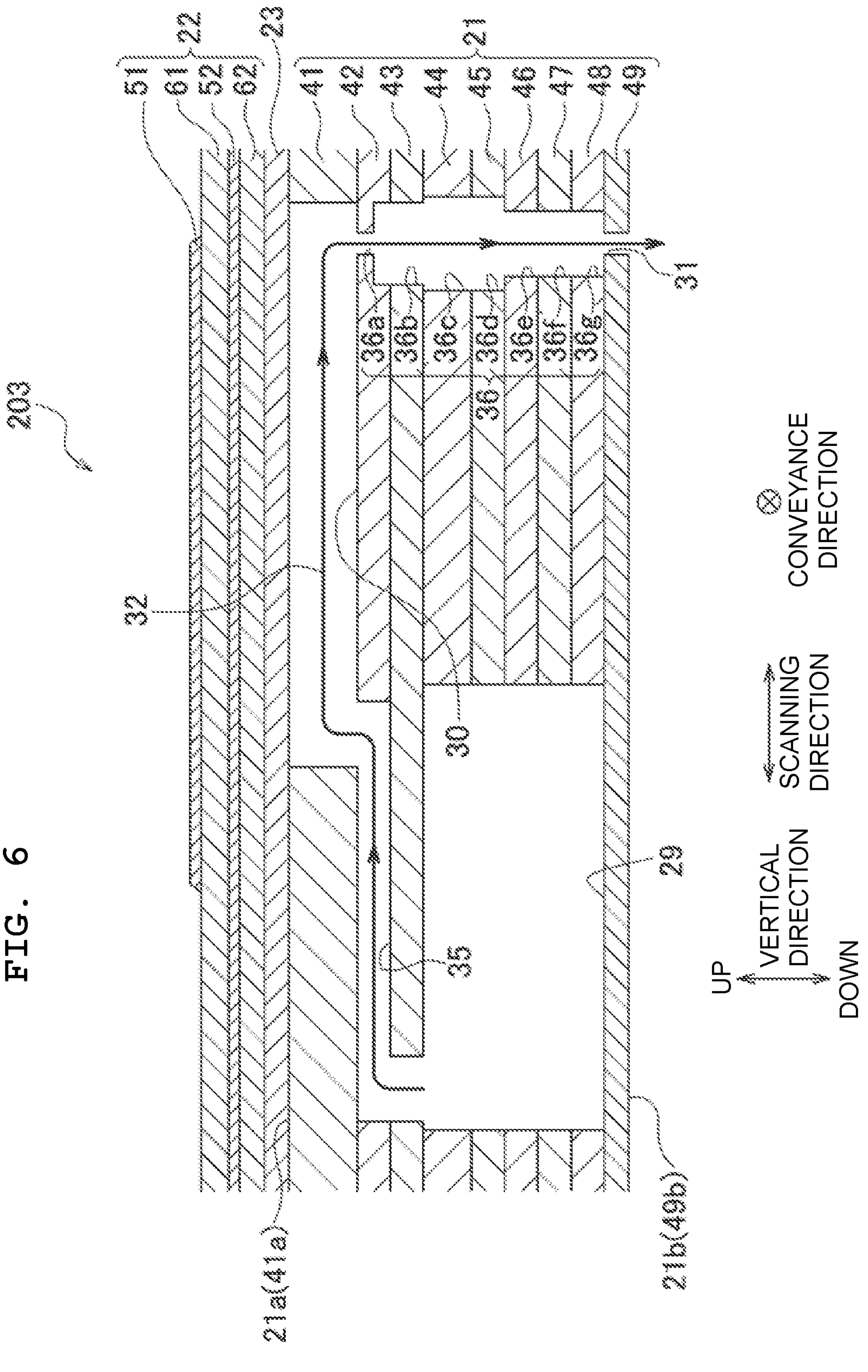
FIG. 6 is a sectional view corresponding to FIG. 3, illustrative of a head 203.

Next, a head 203 according to a second embodiment will be explained with reference to FIG. 6.

In the first embodiment (see FIG. 3), the hole (through-hole), which is defined by the side wall extending in the vertical direction, is formed through the plate 42. The hole constitutes only the portion 36*a*.

In the second embodiment (see FIG. 6), a hole (through-hole), which is constructed by a small diameter portion and a large diameter portion, is formed through the plate 42. The hole constitutes the portion 36*a* and a part (upper end portion) of the portion 36*b*. The small diameter portion constitutes the portion 36*a*. The large diameter portion has a diameter larger than that of the small diameter portion, and the large diameter portion constitutes the part (upper end portion) of the portion 36*b*. The large diameter portion is formed by etching an area of the lower surface of the plate 42 including the small diameter portion.

According to this embodiment, the hole, which is formed through one plate 42, constitutes not only the portion 36*a* but also the portion 36*b*. Accordingly, it is possible to more shorten the channel length of the portion 36*a*. It is possible to more reliably suppress the excessive increase in the channel resistance (consequently, the occurrence of any discharge defect).

Examples

The present inventors observed the state of the ink in the vicinity of the nozzle 31 after the application of the driving signal X when the pulse width of the main pulse Pm was variously changed by using Reference Examples and Working Examples.

Figure 7A:
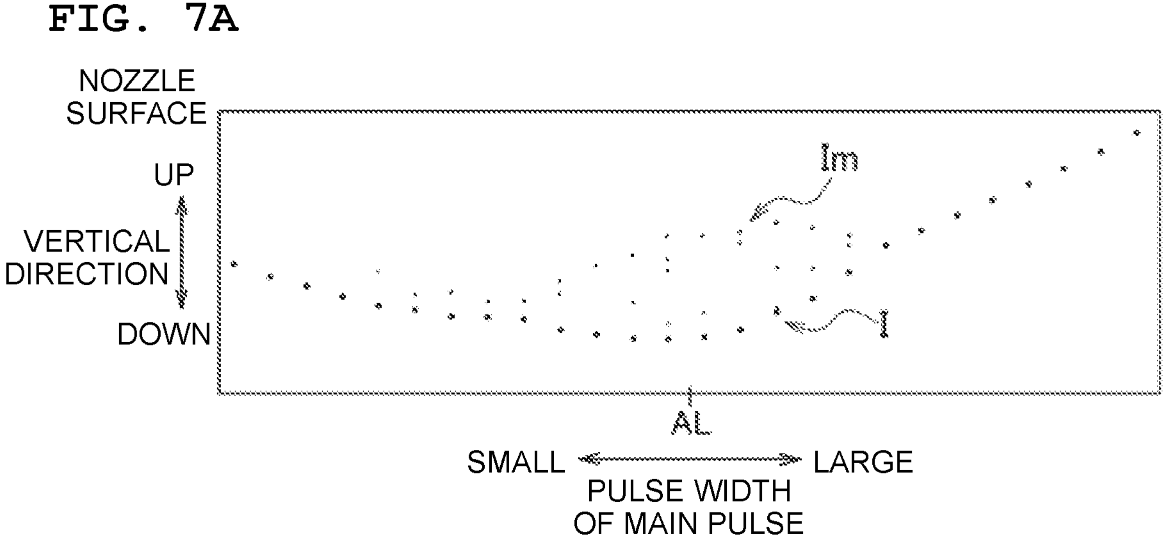
FIGS. 7A to 7C depict graphs illustrative of a state of an ink in the vicinity of a nozzle after applying a driving signal when the pulse width of a main pulse is variously changed in Reference Example.
Figure 7B:
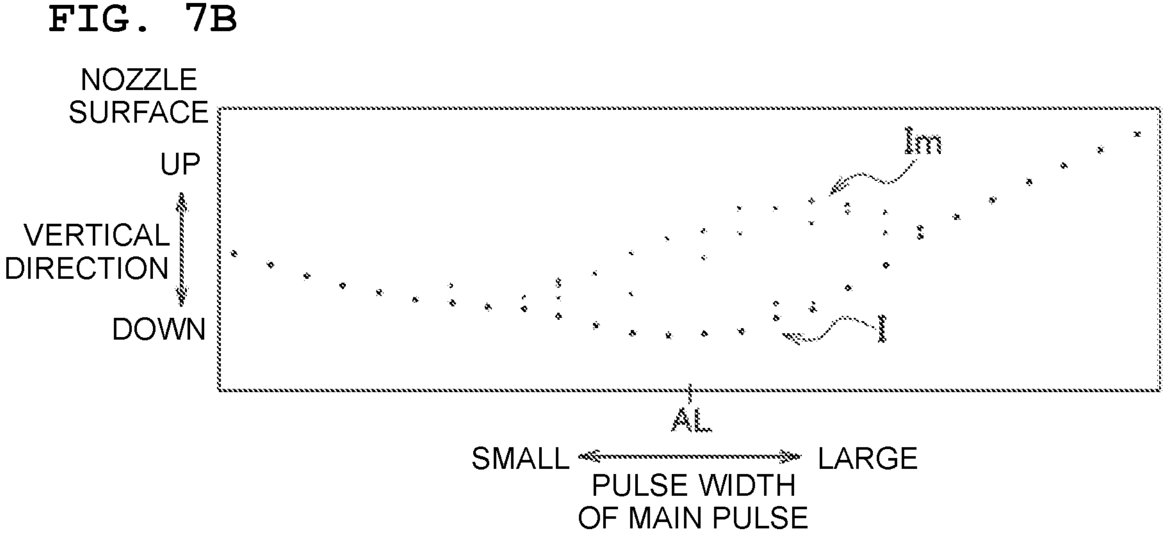
Figure 7C:
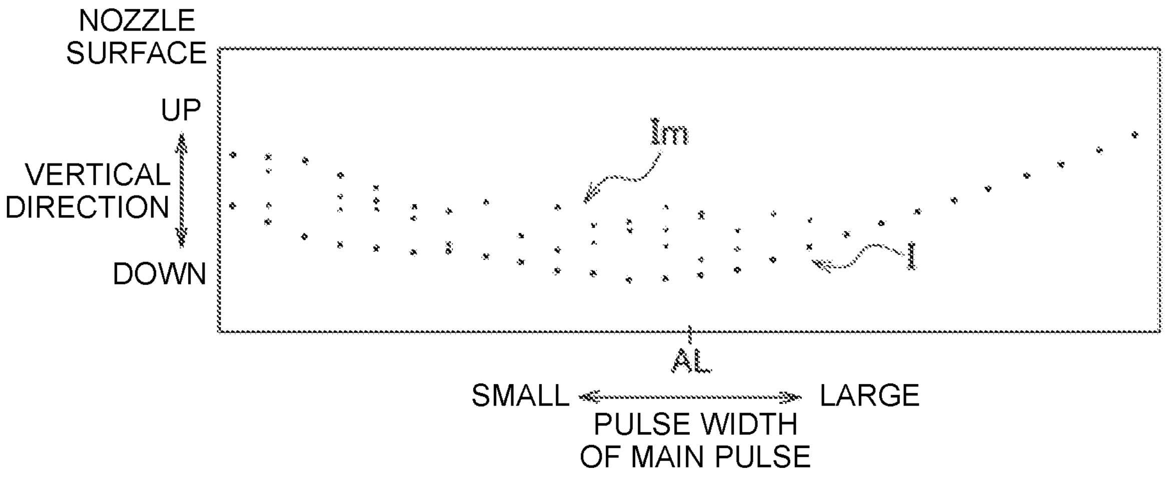

FIGS. 7A to 7C show experimental results of Reference Examples. In FIG. 7A, the individual channel 32 was used, in which the width of the pressure chamber 30 was 400 μm, the depth of the pressure chamber was 50 μm, the diameter of the portion 36*a* was 160 μm, and the diameter of the portion 36*b* was 165 μm ("S1=1.01×S0", "S1=0.94×S2"). In FIG. 7B, the individual channel 32 was used, in which the width of the pressure chamber 30 was 400 μm, the depth of the pressure chamber was 50 μm, the diameter of the portion 36*a* was 160 μm, and the diameter of the portion 36*b* was 110 μm ("S1=1.01×S0", "S1=2.12×S2"). In FIG. 7C, the individual channel 32 was used, in which the width of the pressure chamber 30 was 400 μm, the depth of the pressure chamber was 80 μm, the diameter of the portion 36*a* was 160 μm, and the diameter of the portion 36*b* was 165 μm ("S1=0.63×S0", "S1=0.94×S2"). According to FIGS. 7A to 7C, in relation to any one of Reference Examples, it is understood that a large number of satellites and mists Im are scattered on the side of the nozzle surface as compared with main ink droplets I, and satellites and mists Im appear in a wide range especially in the vicinity of AL.

Figure 8A:
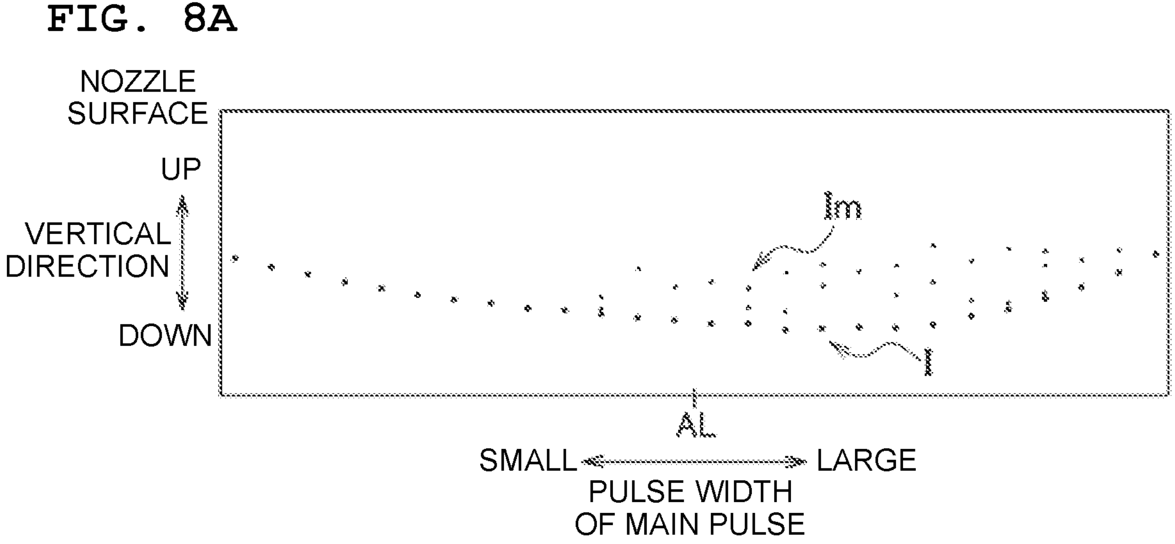
FIGS. 8A to 8C depict graphs illustrative of a state of an ink in the vicinity of a nozzle after applying a driving signal when the pulse width of a main pulse is variously changed in Working Example.
Figure 8B:
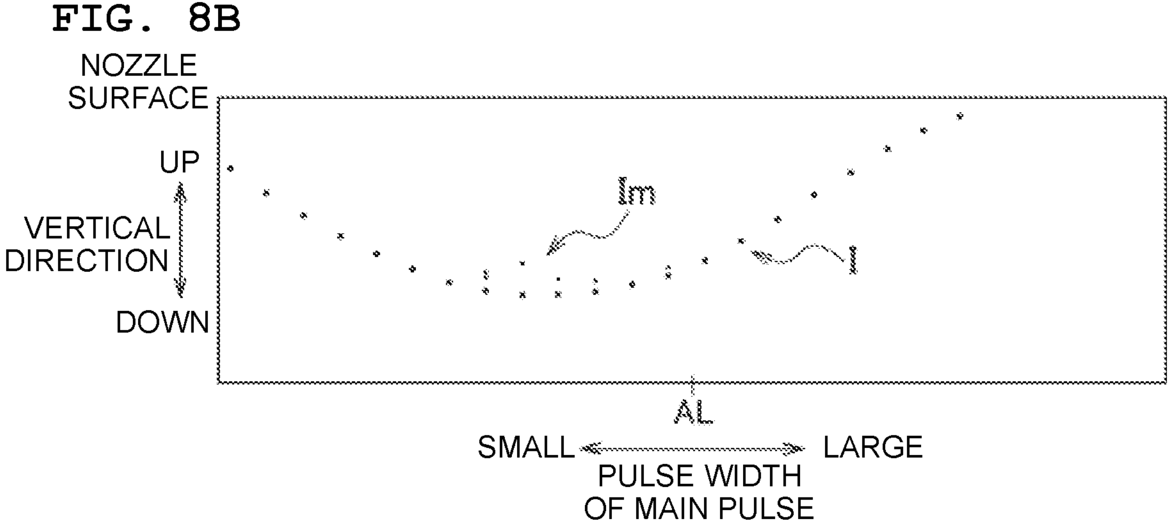
Figure 8C:
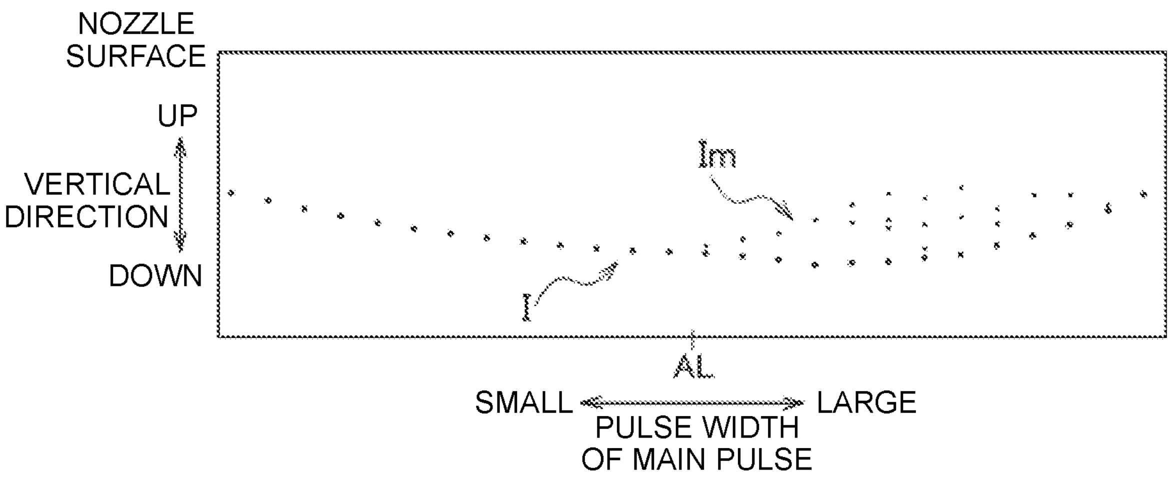

FIGS. 8A to 8C show experimental results of Working Examples. In FIG. 8A, the individual channel 32 was used, in which the width of the pressure chamber 30 was 360 μm, the depth of the pressure chamber was 80 μm, the diameter of the portion 36*a* was 75 μm, and the diameter of the portion 36*b* was 140 μm ("S1=0.15×S0", "S1=0.29×S2"). In FIG. 8B, the individual channel 32 was used, in which the width of the pressure chamber 30 was 400 μm, the depth of the pressure chamber was 50 μm, the diameter of the portion 36*a* was 75 μm, and the diameter of the portion 36*b* was 200 μm ("S1=0.22×S0", "S1=0.14×S2"). In FIG. 8C, the individual channel 32 was used, in which the width of the pressure chamber 30 was 360 μm, the depth of the pressure chamber was 50 μm, the diameter of the portion 36*a* was 75 μm, and the diameter of the portion 36*b* was 165 μm ("S1=0.25×S0", "S1=0.21×S2"). According to FIGS. 8A to 8C, in relation to any one of Working Examples as compared with Reference Examples, it is understood that satellites and mists Im are suppressed, and satellites and mists Im scarcely appear especially in the vicinity of AL.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modified Embodiments

The embodiments of the present disclosure have been explained above. However, the present disclosure is not limited to the foregoing embodiments. It is possible to make various design changes within a scope defined in claims.

The respective portions for constructing the connecting channel are not limited to those having columnar shapes. In the embodiments described above, for example, the channel cross sections of the respective portions are circular. However, the channel cross sections may be elliptical or polygonal.

The respective portions for constructing the connecting channel are not limited to the configuration in which the plurality of portions is defined by the side walls extending in the direction in which the plurality of portions is adjacent to one another. For example, it is also allowable to provide any step on the side wall of each of the portions.

The first portion may be constructed by the holes of the plurality of plates.

The third portion is not limited to the configuration in which the third portion has the largest channel cross-sectional area of those of the plurality of portions for constructing the connecting channel. For example, the channel cross-sectional area of the third portion may be the same as the channel cross-sectional area of the second portion. Alternatively, the channel cross-sectional area of the third portion may be smaller than the channel cross-sectional area of the second portion, and the channel cross-sectional area of the second portion may be the largest of those of the plurality of portions for constructing the connecting channel.

The liquid discharge head is not limited to the serial system. The liquid discharge head may be based on the line system.

The discharge target is not limited to the recording paper. The discharge target may be, for example, cloth, substrates, and plastic members.

The liquid, which is discharged from the nozzle, is not limited to the ink. It is also allowable to use any arbitrary liquid (for example, a processing liquid for coagulating or depositing any component contained in the ink).

The present disclosure is not limited to the printer. The present disclosure is also applicable, for example, to facsimiles, copying machines, and multifunction machines. Further, the present disclosure is also applicable to any liquid discharge apparatus (for example, a liquid discharge apparatus for forming a conductive pattern by discharging a conductive liquid to a substrate) to be used for any way of use other than the image recording.

What is claimed is:

1. A liquid discharge head comprising:

a nozzle plate in which a nozzle is opened; and a channel member including a pressure chamber and a connecting channel connecting the pressure chamber and the nozzle, wherein the connecting channel includes a plurality of portions having mutually different channel cross-sectional areas, the plurality of portions including:

a first portion adjacent to the pressure chamber;

a second portion adjacent to the first portion, the first portion being interposed between the pressure chamber and the second portion, and a third portion adjacent to the second portion, the second portion being interposed between the first portion and the third portion;

the first portion has the smallest channel cross-sectional area among the plurality of portions, third portion has a channel cross-sectional area which is larger than the channel cross-sectional area of the second portion, and a relational expression of S1≤0.3×S0 and a relational expression of S1≤0.7×S2 are fulfilled, assuming that S0 represents channel cross-sectional area of the pressure chamber, S1represents channel cross-sectional area of the first portion, and S2 represents channel cross-sectional area of the second portion.

2. The liquid discharge head according to claim 1, wherein the third portion has the largest cross-sectional area among the plurality of portions.

3. The liquid discharge head according to claim 1, wherein the channel member includes a plurality of plates which is stacked in a thickness direction, and in which a hole forming the connecting channel is formed, and a portion of the hole formed in one plate of the plurality of plates corresponds to the first portion.

4. The liquid discharge head according to claim 3, wherein the portion of the hole, which is formed in the one plate of the plurality of plates, corresponds to the first portion and a part of the second portion.

5. The liquid discharge head according to claim 1, wherein the first portion and the second portion are defined respectively by a lateral wall disposed in a direction in which the first portion and the second portion are adjacent to one another.

* * * * *